United States Patent [19]

Magda

[11] Patent Number: 4,483,486
[45] Date of Patent: Nov. 20, 1984

[54] METHOD AND APPARATUS FOR TREATING LAWNS WITH BOTH GRANULAR AND LIQUID TREATMENT MATERIALS

[75] Inventor: Robert J. Magda, Morganville, N.J.

[73] Assignee: Lawn Doctor, Inc., Matawan, N.J.

[21] Appl. No.: 301,363

[22] Filed: Sep. 11, 1981

[51] Int. Cl.³ .............................................. B05B 1/28
[52] U.S. Cl. .................................. 239/663; 239/150; 239/157
[58] Field of Search ................. 239/97, 100, 124, 127, 239/662, 663, 165, 289, 150, 157

[56] References Cited

U.S. PATENT DOCUMENTS

| | | | |
|---|---|---|---|
| 2,144,890 | 1/1939 | Nakaoka | 239/165 X |
| 2,661,955 | 12/1953 | Sherer . | |
| 2,878,617 | 3/1959 | Finn | 239/127 X |
| 3,019,470 | 2/1962 | Romeo | 239/662 X |
| 3,401,890 | 9/1968 | Middlesworth | 239/662 |
| 3,792,814 | 2/1974 | Platz | 239/149 |
| 3,807,605 | 4/1974 | Meharry et al. | 239/100 |
| 3,826,426 | 7/1974 | Bonvicini | 239/127 |
| 4,106,703 | 8/1978 | Magda | 239/656 |
| 4,281,780 | 8/1981 | Lagani, Jr. | 239/663 X |
| 4,352,463 | 10/1982 | Baker | 239/663 |
| 4,394,966 | 7/1983 | Snyder et al. | 239/127 |

FOREIGN PATENT DOCUMENTS 796852  6/1958  United Kingdom ................ 239/127

*Primary Examiner*—John J. Love
*Attorney, Agent, or Firm*—Parmelee, Bollinger & Bramblett

[57] ABSTRACT

The present invention provides a method and apparatus for treating lawns with both granular and liquid treatment materials, at the selection of the operator. The apparatus includes a compact, hand-operated cart having a storage compartment for accommodating a bin or bins of granular treatment materials and a tank of liquid treatment material. A rotatable spreader belt receives and meters the granular material which is spread by a rotatable spinner plate as the cart is driven. Inlet and outlet hoses received within the tank of liquid material cooperate with a pumping disc rotatably mounted on the cart to provide continuous circulation of the liquid material through the hoses. A spray nozzle coupled to the inlet hose by a valve controlled by the operator, enables the operator to selectively spray the liquid material on a surface to be treated. The spray nozzle is mounted in telescoping relationship to the cart to enable the operator to select and adjust the range which the liquid is sprayed. Hand controls for both the granular spreading and spraying operations are mounted to the cart within easy reach of the operator. Accordingly, the lawn treatment cart may be used to selectively spread only granular material, spray only liquid material, or simultaneously spread and spray both types of materials. Although the apparatus is compact, it is designed to isolate the sprayed liquid from the granular spreading components to avoiding "gumming up" of those components.

11 Claims, 6 Drawing Figures

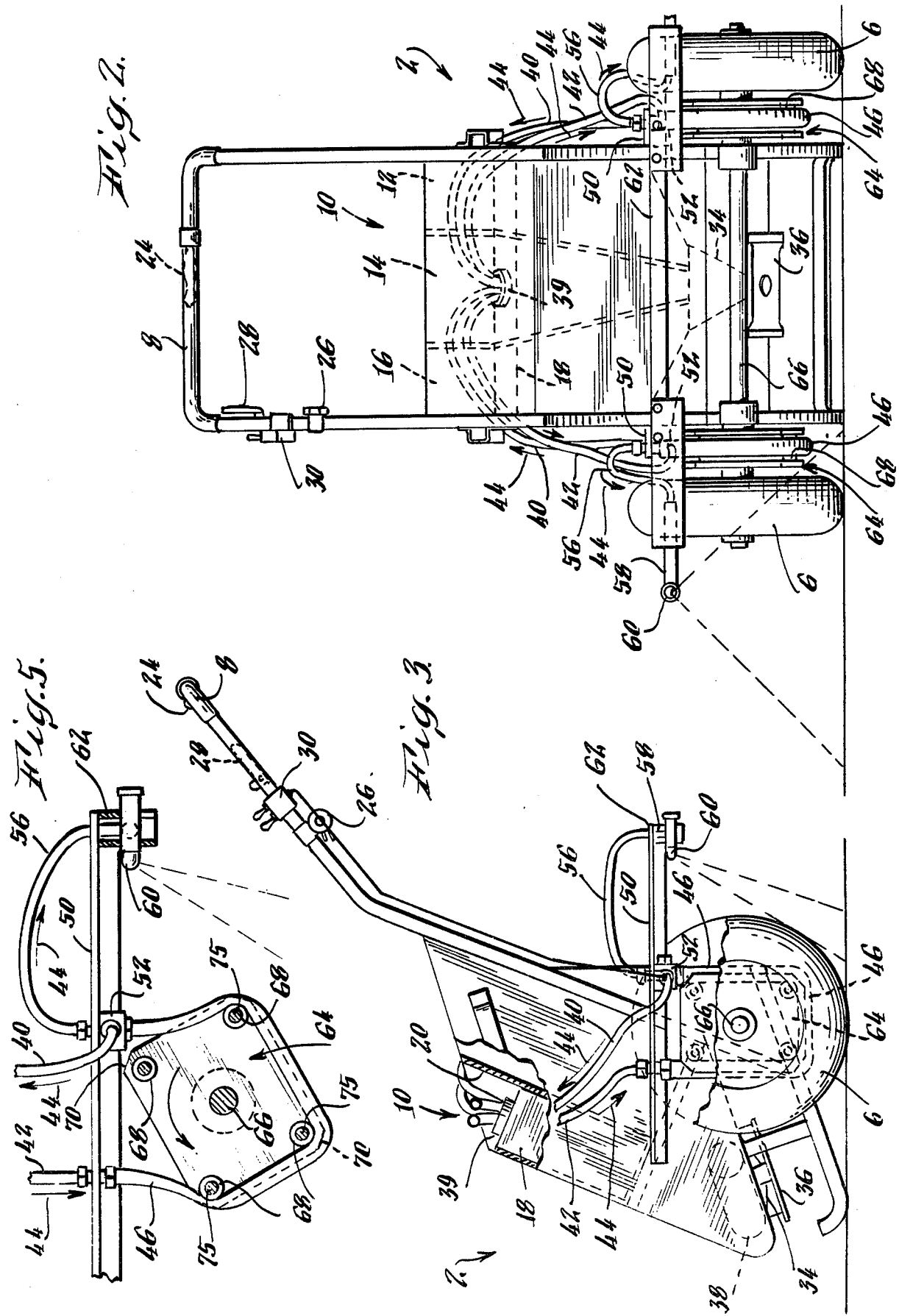

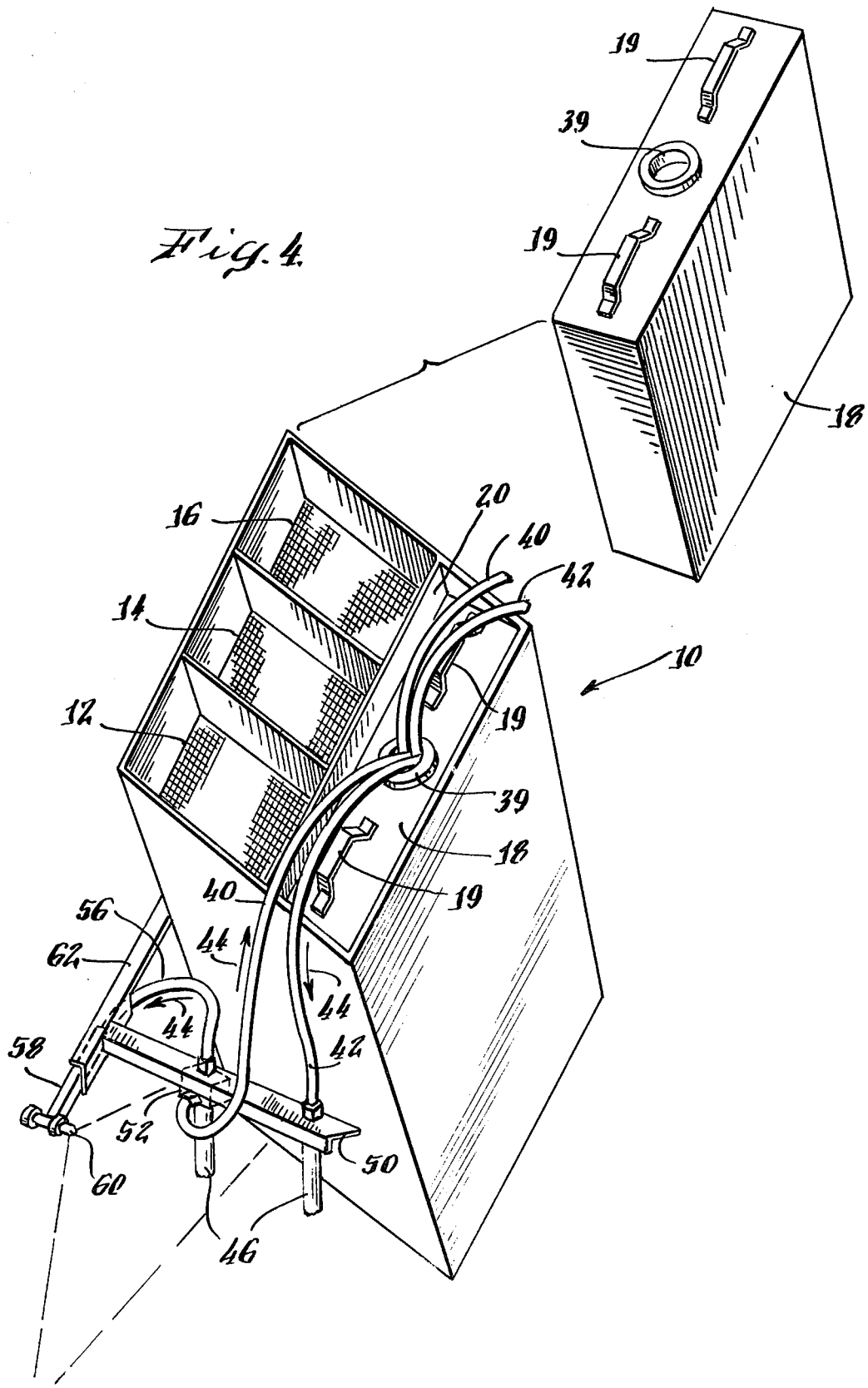

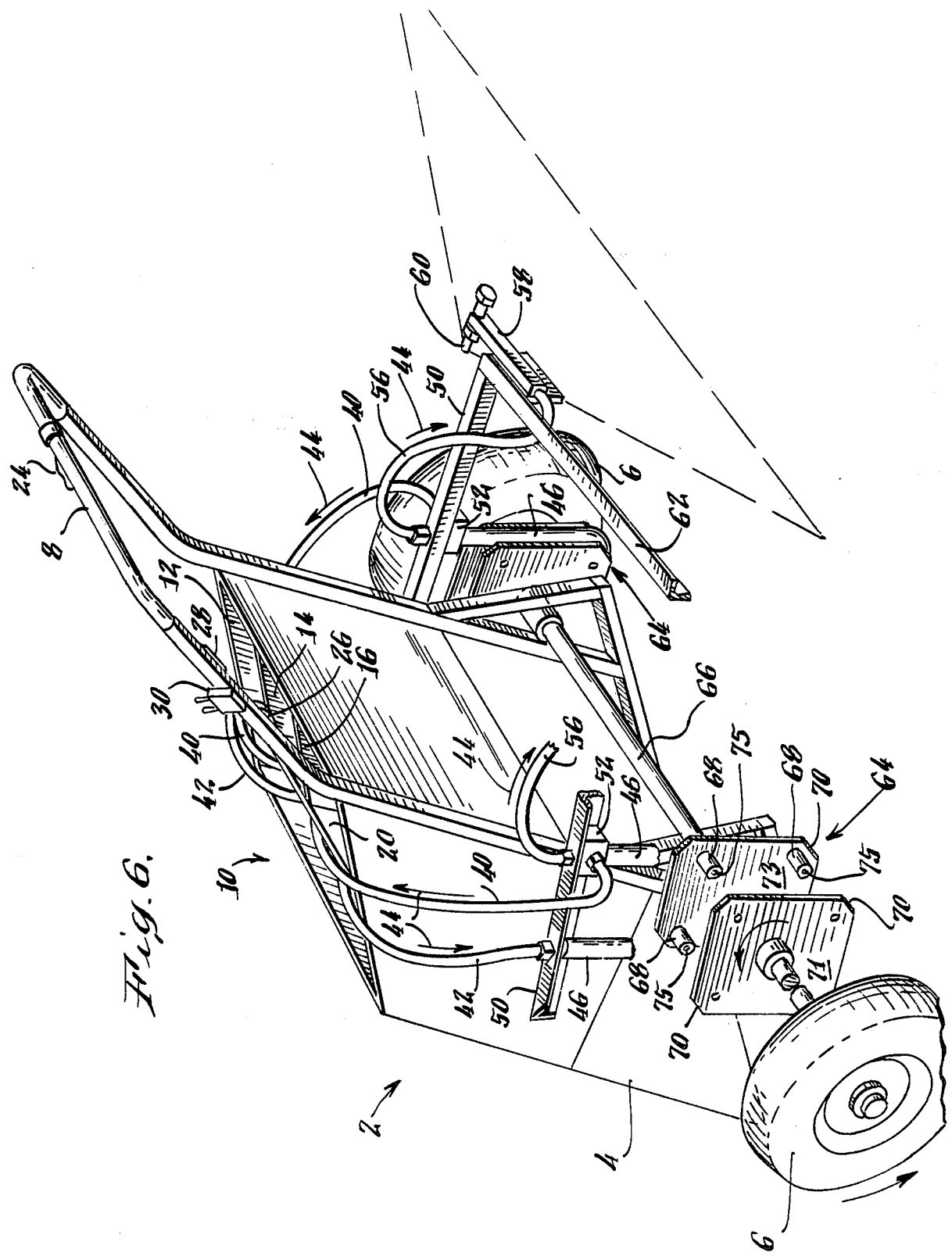

METHOD AND APPARATUS FOR TREATING LAWNS WITH BOTH GRANULAR AND LIQUID TREATMENT MATERIALS

BACKGROUND OF THE INVENTION

The present invention relates to lawn treatment carts used to spread or spray various known treatment materials which enhance lawn growth, destroy weeds, and the like.

Proper treatment and maintenance of a lawn must be periodically performed in order to ensure healthy lawn growth. As most homeowners are aware, lawn maintenance can be a long and tiring project. The specific type of maintenance required by a lawn will vary depending on such factors as the individual terrain characteristics, the climate, and the amount of previous care given to the lawn. However, proper lawn maintenance generally must include the application of various types of seed, fertilizers, insecticides, crabgrass control agents and other materials, depending on the condition of the lawn to be treated.

Prior to the invention of the spreader to be described herein, separate hand-operated apparatus for treatment of a lawn with either liquid or granular material were known. Treatment of a lawn with both liquid and granular material using these separate apparatus requires two distinct steps. The lawn is first treated with one type of material using one apparatus, and subsequently treated with the second material using another apparatus. The duplication of time, labor and costs using this procedure are evident.

Furthermore, although certain apparatus exist which are capable of both spreading granular material and spraying a liquid, these known apparatus are large vehicles similar to tractors or combines of the order of size of at least about 12 feet long. The granular spreading operation occurs at one end of the vehicle while the liquid spraying operation occurs at the other end. The relatively large separation of these two operations on the same vehicle was believed necessary to separate the spray from the granular spreading components to avoid "gumming up" of the granular spreading components, which would adversely affect such granular spreading operation. Moreover, the liquid pumping operation of such vehicles is coupled to the engine speed of the vehicle and not the distance travelled. Accordingly, uniform spraying of the liquid material on the treated terrain is not always possible.

The following U.S. Patents disclose various granular spreaders known to the art: U.S. Pat. Nos. 4,106,703; 3,544,013; 3,446,165; 3,438,585; 3,419,221; 3,220,369; 3,164,301; 2,946,597; 2,741,401; 2,661,955; 2,564,255; 2,550,872; 2,547,143; 2,120,169; 843,680; 841,982; 32,554. Norwegian Pat. No. 99,367 also discloses a granular spreader, and U.S. Pat. No. Des. 200,165 discloses a combine. Only granular material can be spread by the aforementioned spreaders.

U. S. Pat. No. 3,792,814 discloses an apparatus used to spray fertilizer. It includes a tank of liquid fertilizer pivotally mounted to a trailer which is adapted to be towed by a vehicle. This liquid sprayer is not capable of spreading granular material. Another separate step would be required to treat a lawn with granular material.

It is apparent from the aforementioned patents, which are typical of the lawn spreader art, that none of the disclosed compact or hand-operated spreaders or sprayers eliminates the duplication of work which must be performed by the operator of such compact apparatus. That is, since each of the disclosed carts performs only a single operation, an operator must first treat a lawn with either only a liquid or granular type material, and subsequently repeat the treatment with the other type material. This duplicative two-stage lawn treatment procedure is obviously time consuming and expensive.

Compact granular spreaders which are hand-operated by an operator, as for example the spreader disclosed in U. S. Pat. No. 4,106,703, include an endless rotatable spreader belt which receives granular treatment material and assists in dispersing the material on the lawn. In that patent, material deposited on the belt is fed into a rotating spinner plate for spreading on a lawn to be treated. Providing such a compact, hand-operated granular spreader with liquid spray capability would appear to be unfeasible because the size of the spreader is sufficiently small that mixing of the liquid spray with the granular spreader components is possible. Both the liquid in the spreader and the liquid mist sprayed from the spreader might moisten the granular spreader components causing them to "gum up", thereby adversely affecting the granular spreading operation. In any event, as evidenced by the aforementioned patents, there is no suggestion in the known compact, hand-operated lawn treatment art to provide a spreader capable of both spreading granular material and spraying liquid material. Also, as noted above, larger vehicles prevent mixing of liquid and granular materials by separating the two operations by a large distance. Obviously, this solution is impractical, if not impossible, in a small compact apparatus.

Thus, applying both granular and liquid material to a lawn requires either a two-step procedure using two different apparatus and duplication of effort, or use of a large and expensive vehicle to perform both operations.

The present invention provides a compact, hand-operated lawn treatment apparatus which enables its operator to selectively spread granular material, spray liquid material, or simultaneously spread and spray both types of material. The spreader is designed to prevent application of the liquid material on any of the granular spreading components. The duplication of steps now required to spread both granular and liquid material using a compact spreader, or the need to acquire a large and expensive vehicle to perform both operations, is eliminated by the present invention.

In a further aspect of the present invention, a known compact, hand-operated granular spreader can be readily retrofitted to provide a liquid spray capability.

SUMMARY OF THE INVENTION

The present invention provides a method and apparatus for treating lawns with granular treatment materials, liquid treatment materials, or both, at the selection of the operator. The spreader is compact, intended to be hand-operated, and includes a housing having a bin or bins for accommodating granular treatment material or materials, and means for dispersing the material on a lawn to be treated. A compartment for storing a tank of liquid treatment material is provided within the housing. Hose means having an inlet and an outlet received within the tank define a liquid flow path from the tank, through the hose means, and back to the tank. A spray nozzle coupled to the hose means through a valve controlled by the operator enables the operator to selectively cause liquid flowing through the hose to be sprayed through the spray nozzle instead of returning to the tank. Pumping means operatively associated with the hose means provide continuous flow of liquid as the apparatus is driven. The position of the spray nozzle is adjustable relative to the housing so that the operator can select the range of spray of liquid discharged through that nozzle, and the spray nozzle is positioned to prevent sprayed liquid from settling on the granular spreading components of the spreader.

In a further aspect of the invention, known spreaders having only granular spreading capability can be readily retrofitted with liquid treatment features.

The spreader embodied in the present invention enables an operator to selectively apply both liquid and granular treatments in a single operation, resulting in substantial savings in time, costs, and energy.

BRIEF DESCRIPTION OF THE DRAWINGS

FIG. 2 illustrates a rear elevational view, partly in section, of the lawn treatment apparatus of FIG. 1, FIG. 3 illustrates, partly in section, a side elevational view of the apparatus of FIG. 1, FIG. 4 illustrates a top plan view of the apparatus of FIG. 1 showing a storage compartment for accommodating both liquid and granular lawn treatment material, FIG. 5 illustrates the pumping action of a rotatable cam on a pumping hose in accordance with one aspect of the present invention, and FIG. 6 illustrates an exploded view of a liquid circulation and spray system attachable to the chassis of the lawn treatment apparatus embodied in the present invention.

DESCRIPTION OF THE PREFERRED EMBODIMENT

Figure 1:
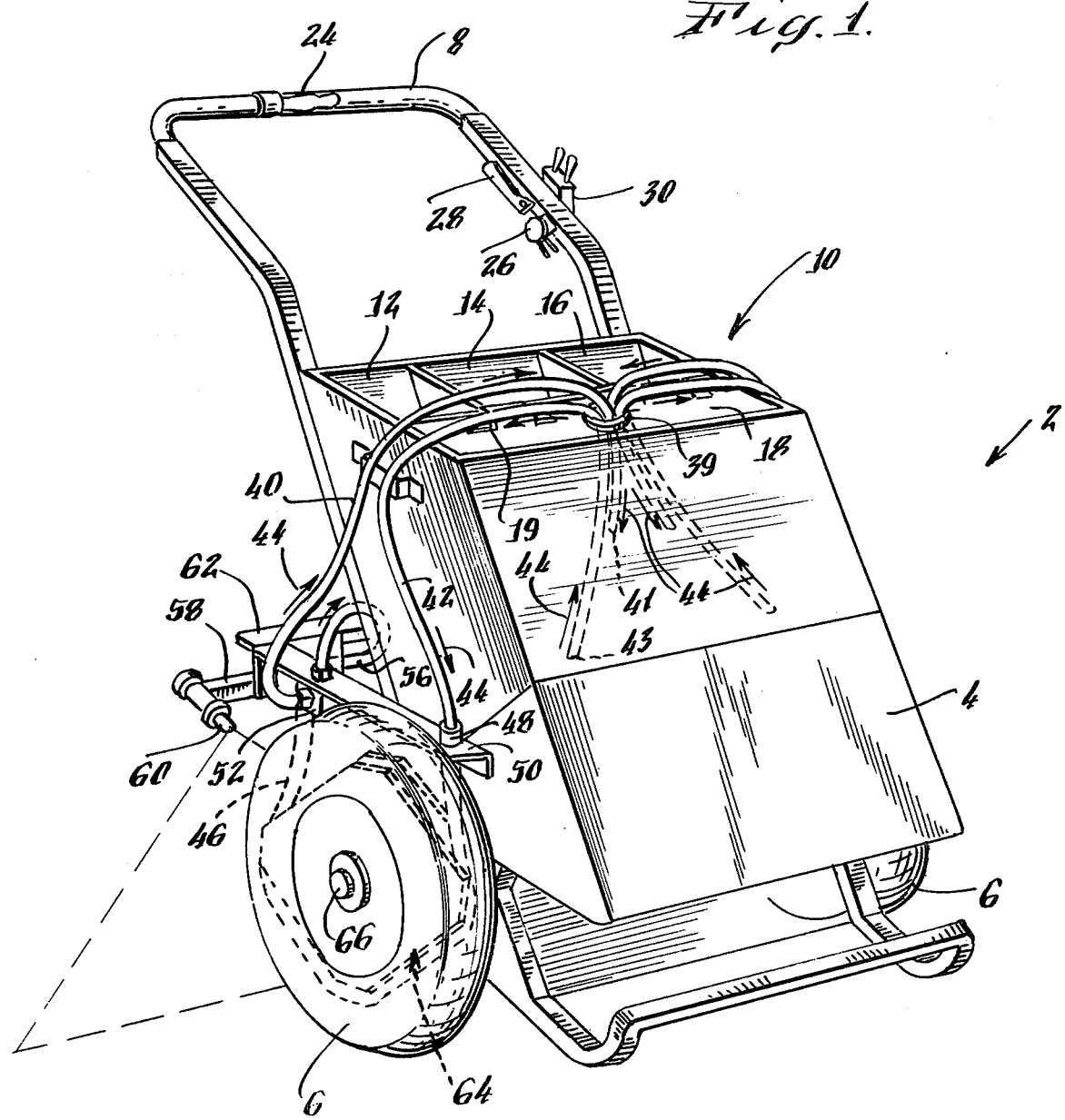
FIG. 1 illustrates a perspective view of an apparatus for treating lawns with both granular and liquid material in accordance with the present invention.

FIGS. 1-6 of the drawings illustrate the preferred embodiment of a lawn treatment apparatus for providing both liquid and granular lawn treatment or maintenance in accordance with the present invention. The disclosure and drawings of U. S. Pat. No. 4,106,703 issued to Robert J. Magda on Aug. 15, 1978, are incorporated by reference into the description of the instant invention.

FIG. 1 of the drawings illustrates a perspective view of a lawn treatment apparatus enabling its operator to selectively spread a granular material, spray a liquid material, or simultaneously do both. The lawn treatment apparatus eliminates repetition of treatment steps in first spreading a granular material and then repeating the treatment operation for spraying a liquid material.

The apparatus, generally illustrated by reference numeral 2, includes a main body or chassis 4, supporting wheels 6 mounted to the chassis and extending from each side thereof, and a handle 8 for driving the apparatus. The chassis is compact, being about 3 feet in length by about 3 feet in width by about 3 feet in height, and is intended to be maneuvered by hand using the handle 8. The chassis defines a storage compartment, shown generally by the reference numeral 10, including a plurality of granular storage bins 12, 14 and 16, and a space for accommodating a removable container 18 containing a liquid lawn treatment material. A partition 20 separates the granular storage bins from the container holding the liquid material. FIG. 4 of the drawings illustrates the bins and the container mounted in the storage compartment in greater detail and also shows the container 18 removed from the storage compartment of the chassis.

FIGS. 2 and 3 illustrate rear and side views of the subject lawn treatment apparatus. In particular, a clutch control 24, a lever 26 coupled to a cable (not shown), a motor control switch 28, and a pump control solenoid switch 30 are mounted to the handle 8. Granular material from the three storage bins 12, 14 and 16 drop on to the top surface of a rotatable endless belt (not shown). The belt is mounted about a pair of rollers (not shown) which in turn, are coupled to the wheels 6 of the chassis so that the belt rotates when the chassis is driven. Granular material on the top surface of the belt drops into a hopper 34 positioned beneath the upstream end of the belt, and is received in a spinner plate 36 beneath the hopper. The spinner plate disperses the granular material received therein.

A motor 38, operated by motor switch 28 on the handle 8, drives the spinner plate 36. Lever 26 and its associated cable may be used to vary the position of the spinner plate, movably mounted in an arcuate slot on the bottom of the chassis, to control the position of the spinner plate relative to the chassis. In this manner, granular material can be dispensed by the spinner plate over a greater distance on one side of the chassis than the other. A clutch (not shown) for disengaging the pair of rollers from the wheels 6, is controlled by clutch control 24. Accordingly, the chassis can be driven without causing rotation of the belt or spreading of the granular material.

The granular spreading features discussed above are more fully explained and illustrated in the specification and drawings of U. S. Pat. No. 4,106,703, the drawings and disclosure of said patent being expressly incorporated by reference into the present specification. It is, however, evident that U. S. Pat. No. 4,106,703 provides only a granular lawn treatment spreader, and does not suggest a lawn treatment apparatus having the capability of selectively applying both granular and liquid lawn treatment materials.

Referring back to FIGS. 1-4 of the drawings, it is seen that the container 18 for holding liquid treatment materials accommodated in the storage compartment 10 of the chassis, includes a top opening 38. An inlet hose 40 and an outlet hose 42 are received in the container through the opening. The inlet end 43 of the outlet hose is received directly in the liquid treatment material, while the outlet end 41 of the inlet hose is positioned above the level of liquid material. Directional arrows 44 indicate flow of liquid into and out of the container.

The outlet hose 42 is coupled to a pumping hose 46 by a coupling 48 on a supporting member 50 mounted outside the chassis of the spreader. Pumping hose 46 loops around the space defined between the chassis and the inside of wheel 6 and is coupled to the inlet of a solenoid valve 52 mounted to the supporting member 50. The outlet end of the solenoid valve is, in turn, selectively coupled to the inlet hose 40 which returns to the liquid container 18, or to a spray hose 56 supported on a member 58. The outlet end of the spray hose terminates in a spray nozzle 60 mounted to the end of the member 58. The member 58 is mounted in telescoping relationship to a support boom 62, and a sufficient degree of slack is provided in the spray hose so that the member 58 can be extended laterally to a predetermined distance from the side of the chassis. In this manner, the range of spray of liquid relative to the side of the chassis can be selectively adjusted by the operator.

Thus, the position of the solenoid valve 52 determines whether liquid will be returned to the storage container 18 through the inlet hose 40 or sprayed through the spray hose 56 and the nozzle 60. The solenoid valve itself is controlled by the solenoid switch 30 mounted to the handle 8 of the treatment apparatus. Accordingly, the operator may, at his selection, spray liquid material on the lawn being treated.

Although FIGS. 1–4 of the drawings illustrate spray capability on one side of the chassis, identical hoses, couplings, nozzles and supports may be provided on the other side of the chassis.

Referring now to FIGS. 1–6, a pumping member 64 is mounted to an axle 66 which connects the wheels 6 of the spreader to its chassis. As such, the pumping member rotates along with the axle 66 as the apparatus is driven and the wheels 6 are turning. Specifically referring to FIGS. 5–6, the pumping member is generally rectangular shaped and includes a plurality of rollers 68 recessed within its corners 70. More specifically, the pumping member is formed from two plates 71 and 73 joined together at their respective corners by four shafts 75. Each shaft supports one of the rollers 68. The pumping hose is mounted to the chassis, as described above, in such a position relative to the pumping member such that the pumping hose and at least one of the rollers of the pumping member are in continuous engagement. The length of the pumping hose is selected to assure such continuous engagement with the pumping member. As the apparatus is driven, wheels 6 and axle 66 rotate, causing the pumping member to rotate. Because of the eccentric shape of the pumping member, rotation thereof causes reciprocation of the pumping hose, resulting in the circulation of liquid from the container, through the outlet hose (which is received directly in the liquid) and pumping hoses, and either through the spray hose for discharge or the inlet hose for return to the tank 18, depending on the position of the solenoid valve. Note that the pumping hose is mounted in a stationary position on the chassis relative to the rotating pumping member, to insure that that hose will not slip but remains continually engaged on the rollers 68 in the corner recesses of the pumping member, and will be periodically flexed or reciprocated by the rotating pumping member. Although the pumping member is generally rectangular as shown, it may also be of any suitable eccentric shape or eccentrically mounted relative to said pumping hose so as to cause flexing of the pumping hose when the pumping member is rotated. The pumping hose (and the other hoses) are formed from a resilient, flexible material, preferably rubber.

Accordingly, as the lawn treatment apparatus is driven, liquid in the container 18 is continuously circulated or pumped through the outlet hose, the pumping hose, and either the spray hose or the inlet return hose. When liquid spray is desirable, the operator adjusts the solenoid switch so that liquid from the pumping hose is directed through the spray hose and spray nozzle. Note that the speed of rotation of the pumping member (and thus the frequency of the reciprocation or flexing of the pumping hose) corresponds to the speed at which the wheels 6 are rotating (i.e., the speed at which the apparatus is driven). Accordingly, the faster the apparatus is driven, the greater is the frequency of the pumping action, and the greater is the rate that the liquid material is sprayed. Consequently, the quantity of liquid sprayed per unit area of lawn to be treated will remain substantially constant regardless of the speed at which the apparatus is driven.

On the other hand, if no spray is required, the operator adjusts the solenoid switch so that the solenoid valve directs liquid from the pumping hose to the inlet return hose and back into the container. In this situation, liquid is continuously circulating into and out of the container, advantageously providing continuous agitation and mixing of the liquid. Furthermore, continuous liquid pressure is maintained in the system when spraying is required.

Preferably, the normal position of the solenoid switch is such that there is no spray. Accordingly, the operator must actuate the switch if spraying is required, but will do nothing when no spraying is desired.

The spray nozzle itself is mounted to the rear of the chassis behind the wheel 6. As discussed above, the relative distance that the nozzle extends laterally from the side of the chassis is adjustable. The rearward location of the spray nozzle and its lateral adjustment capability tend to assure that substantially no liquid will be sprayed on the granular material in the chassis or the granular spreading components (e.g., the rotatable belt, hopper or spinner plate) which are positioned towards the front of the apparatus. Accordingly, the difficulty of "gumming up" of the granular spreading operation is avoided. Moreover, because the spray nozzle is behind the wheel of the chassis, the wheels also act as a shield to protect the internal granular spreader components in front of the wheel from sprayed liquid treatment material. The spray nozzle is slightly elevated above the bottom of the chassis from which the granular material is dispersed to further separate sprayed liquid from the granular spreader components. The sidewalls of the chassis provide a further protective barrier between sprayed liquid and the granular spreading components within the chassis. Furthermore, because the discharge means are positioned towards the rear of the apparatus, the apparatus is moving away from the spraying liquid as it is pushed forwardly by the operator.

The tank 18 of liquid material is easily replaceable. When liquid is depleted, the inlet and outlet hoses are removed from the tank, the tank is refilled or replaced with a filled tank, and the inlet and outlet hoses are again inserted into the tank through the opening in its top. FIG. 4 of the drawings illustrates the tank 18 both in its operating position in the chassis, and also removed from the chassis. The tank includes handles 19 attached to its top to facilitate carrying of the tank. In situations where no liquid treatment is necessary, the container 18 can be completely removed, and the space occupied by the container in the storage compartment 10 can be used to store additional granular material.

It is also apparent that an existing granular spreader may be readily retrofitted with liquid spray capability in accordance with the embodiment of the present invention discussed herein by providing a space for a liquid tank in the chassis, and providing the required hoses, coupling, valves, supports and pumping means as fully described herein.

Although the preferred embodiment discussed herein includes separate outlet, pumping and inlet hoses, it is within the scope of the present invention to utilize a single hose instead. Such single hose would include an inlet end received directly in the liquid material and an outlet end received within the storage tank or container 18 above the liquid level. The single hose is mounted to the chassis such that the pumping member engages and reciprocates a portion of the hose causing liquid material to be drawn into the inlet end of the hose, in the same manner as in the described embodiment. Valve means are coupled to the single hose as described herein. The operation of a single hose embodiment is identical to that of the multiple hose preferred embodiment.

The lawn treatment apparatus described herein provides the capability of treating a lawn with either granular material, liquid material, or both simultaneously, using a compact spreader. The various controls for granular and liquid treatment are conveniently located near the operator on the apparatus. As discussed, the apparatus provides a substantial savings in equipment, maintenance of equipment, storing of equipment, costs, and labor. That is, the present apparatus avoids either the duplication of steps in treating a lawn with both liquid and granular material if two separate compact apparatus are used, or the acquisition of a larger and expensive tractor-size vehicle if one apparatus is to be used.

The above discussion is intended to be illustrative only, and not restrictive of the scope of the invention, that scope being defined by the following claims and all equivalents thereto.

I claim:

1. A compact, hand-controlled apparatus for applying treatment materials to the terrain for enhancing and maintaining growth thereon, said apparatus including:
    a chassis, wheels mounted to said chassis, and a handle mounted to said chassis for propelling said chassis, said chassis including storage means for accommodating granular treatment material,
    means for applying said granular material to said terrain to be treated,
    means defined in said chassis for accommodating a liquid treatment material,
    hose means having an inlet and outlet received within said means for accommodating said liquid treatment material,
    valve means coupled to said hose means between said inlet and outlet,
    discharge means coupled to said valve means for discharging said liquid treatment material from said hose means,
    said discharge means being mounted to said chassis proximate the outer sidewall of at least one of said wheels, said wheel being disposed between said discharge means and said means for applying said granular material to shield said means for applying said granular material from the spray of said liquid treatment material from said discharge means,
    said valve means being selectively movable between a first position in which only said inlet and said outlet of said hose means are in fluid communication through said valve means, and a second position in which said hose means is in fluid communication with only said discharge means through said valve means, and
    means for transporting said liquid treatment material from said means in said chassis for accommodating said liquid treatment material and into said inlet of said hose means whenever said chassis is propelled on said wheels, said transported liquid treatment material being returned to said means for accommodating said liquid treatment material through said outlet of said hose means whenever said chassis is propelled on said wheels and said valve means is in said first position, said transported liquid treatment material being discharged through said discharge means whenever said chassis is propelled on said wheels and said valve means is in said second position, said liquid treatment material being continuously circulated through said hose means when said valve means is in said first position and said chassis is being propelled on said wheels,
    said continuous circulation of said liquid treatment material providing substantially uninterrupted liquid flow and pressure of said liquid treatment material transported into said hose means when said valve means is switched between said first and second positions.

2. The apparatus as claimed in claim 1 including a container for storing said liquid treatment material, said container being removably mountable in said means defined in said chassis for accommodating said liquid treatment material, said container having an opening thereon for receiving said inlet and outlet of said hose means.

3. The apparatus as claimed in claim 1 wherein said valve means includes a solenoid valve, said apparatus further including a switch operatively associated with said solenoid valve for controlling the position of said valve between said first and second positions thereof.

4. The apparatus as claimed in claim 1 wherein said discharge means includes a discharge hose coupled at its inlet end to said valve means.

5. The apparatus as claimed in claim 4 further including a spray nozzle coupled to the outlet end of said discharge hose.

6. The apparatus as claimed in claim 1 further including means for selectively adjusting the lateral position of said discharge means relative to said chassis.

7. The apparatus as claimed in claim 1 wherein said discharge means are mounted to said chassis at an elevation above that of said means for applying said granular material to separate sprayed liquid from said discharge means from said means for applying said granular material.

8. The apparatus as claimed in claim 1 wherein said chassis includes at least one sidewall, said discharge means being mounted to said chassis on one side of said sidewall and said means for applying said granular material being mounted within said chassis on the other side of said sidewall, said sidewall serving to separate sprayed liquid from said discharge means from said means for applying said granular material.

9. The apparatus of claim 1 wherein said means for applying said granular material is positioned towards the front end of said chassis and said discharge means are mounted towards the rear end of said chassis,
    whereby said chassis moves away from said spraying liquid from said discharge means as said apparatus is pushed forwardly.

10. A compact, hand-controlled apparatus for applying treatment materials to the terrain for enhancing and maintaining growth thereon, said apparatus including:
    a chassis, wheels mounted to said chassis, and a handle mounted to said chassis for propelling said chassis, said chassis including storage means for accommodating granular treatment material,
    means for applying said granular material to said terrain to be treated,
    means defined in said chassis for accommodating a liquid treatment material, an inlet hose mounted to said chassis and having one end thereof received within said means for accommodating said liquid treatment material, an outlet hose mounted to said chassis and having one end thereof received within said means for accommodating said liquid treatment material, a pumping hose coupled between the ends of the inlet and outlet hoses remote from said means for accommodating said liquid treatment material, valve means operatively associated with said pumping hose, discharge means coupled to said valve means for discharging said liquid treatment material from said pumping hose, said discharge means being mounted to said chassis proximate the outer sidewall of at least one of said wheels, said wheel being disposed between said discharge means and said means for applying said granular material to shield said means for applying said granular material from the spray of said liquid treatment material from said discharge means, said valve means being selectively movable between a first position in which said outlet hose is coupled to said inlet hose through said pumping hose, and a second position in which said pumping hose is coupled to said discharge means through said valve means, and means engaging said pumping hose for transporting said liquid treatment material from said means in said chassis for accommodating said liquid treatment material through said outlet hose, said pumping hose, and said valve means, whenever said chassis is propelled on said wheels, said liquid treatment material being returned to said means for accommodating said liquid treatment material through said inlet hose whenever said chassis is propelled on said wheels and said valve means is in said first position, said liquid treatment material being continuously circulated through only said outlet, pumping and inlet hoses when said chassis is propelled and said valve means is in said first position, and said liquid treatment material being discharged through said discharge means only when said valve means is in said second position, said pressure and flow of said liquid treatment material in said outlet hose remaining substantially continuous as a result of said continuous circulation thereof when said valve means is switched between said first and second positions.

11. The apparatus as claimed in claim 10 wherein said means for transporting includes an eccentrically shaped or mounted pumping member coupled to at least one wheel of said apparatus and rotatable therewith, said pumping member being positioned to engage said pumping hose and provide reciprocating movement thereof when said pumping member is rotating.

* * * * *